United States Patent
Bittermann et al.

(10) Patent No.: US 12,122,268 B2
(45) Date of Patent: Oct. 22, 2024

(54) BACKREST FOR A VEHICLE SEAT, AND BACKREST HEAD MODULE

(71) Applicant: Brose Fahrzeugteile SE & Co. Kommanditgesellschaft, Coburg, Coburg (DE)

(72) Inventors: Thomas Bittermann, Coburg (DE); Jochen Hofmann, Marktgraitz (DE); Marcel Amstein, Marisfeld (DE); Jörg Gropp, Böhlen (DE); Jacqueline Albrecht, Kolitzheim (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 982 days.

(21) Appl. No.: 16/972,346

(22) PCT Filed: Jun. 12, 2019

(86) PCT No.: PCT/EP2019/065310
§ 371 (c)(1),
(2) Date: Dec. 4, 2020

(87) PCT Pub. No.: WO2019/238735
PCT Pub. Date: Dec. 19, 2019

(65) Prior Publication Data
US 2021/0245634 A1    Aug. 12, 2021

(30) Foreign Application Priority Data
Jun. 13, 2018  (DE) ............... 10 2018 209 438.1

(51) Int. Cl.
*B60N 2/22*  (2006.01)
*B60N 2/02*  (2006.01)
*B60N 2/23*  (2006.01)
*B60N 2/809*  (2018.01)

(52) U.S. Cl.
CPC ............. *B60N 2/2222* (2013.01); *B60N 2/23* (2013.01); *B60N 2/809* (2018.02); *B60N 2002/0216* (2013.01); *B60N 2/02253* (2023.08)

(58) Field of Classification Search
CPC ........ B60N 2/2222; B60N 2/23; B60N 2/809; B60N 2002/0216; B60N 2/02253
USPC .............................. 297/410, 230.14
See application file for complete search history.

(56) References Cited

U.S. PATENT DOCUMENTS

| | | | | |
|---|---|---|---|---|
| 4,610,480 A | * | 9/1986 | Yamada | B60R 22/40 242/379.2 |
| 5,120,109 A | * | 6/1992 | Rangoni | |
| 7,845,729 B2 | * | 12/2010 | Yamada | B60N 2/02246 297/354.11 |

(Continued)

FOREIGN PATENT DOCUMENTS

| | | | | |
|---|---|---|---|---|
| CN | 101677692 A | * | 3/2010 | A47C 7/38 |
| CN | 102029930 A | | 4/2011 | |

(Continued)

*Primary Examiner* — Milton Nelson, Jr.
(74) *Attorney, Agent, or Firm* — Dickinson Wright PLLC

(57) ABSTRACT

A backrest for a vehicle seat, comprising a backrest frame on which a backrest head support element provided for supporting a seat user in the shoulder region can be pivoted. In particular, the support element can be pivoted via a drive unit arranged on the support element and a lever mechanism which interacts with the drive unit so as to be actuated by an external force.

18 Claims, 15 Drawing Sheets

(56) References Cited

U.S. PATENT DOCUMENTS

| | | | |
|---|---|---|---|
| 9,656,582 B2 * | 5/2017 | Komatsubara | B60N 2/4249 |
| 2006/0226683 A1 | 10/2006 | Massara et al. | |
| 2010/0102605 A1 | 4/2010 | Yamada et al. | |
| 2013/0300174 A1 | 11/2013 | Ito | |
| 2015/0251575 A1 * | 9/2015 | Ishihara | B60N 2/818 |
| | | | 297/391 |

FOREIGN PATENT DOCUMENTS

| | | | | |
|---|---|---|---|---|
| DE | 3909221 A1 | 10/1990 | | |
| DE | 69402674 T2 | 11/1997 | | |
| DE | 19740588 A1 | 3/1999 | | |
| DE | 19917050 A1 | 10/1999 | | |
| DE | 10328044 A1 | 2/2005 | | |
| DE | 102006045387 A1 | 10/2007 | | |
| DE | 102007028034 A1 | 12/2008 | | |
| DE | 102007034462 A1 | 2/2009 | | |
| DE | 102013102380 A1 * | 9/2014 | | A47C 1/0242 |
| EP | 1134114 A2 | 9/2001 | | |
| EP | 1270316 A2 | 1/2003 | | |
| FR | 2844489 A1 | 3/2004 | | |
| FR | 2867725 A1 | 9/2005 | | |
| GB | 2318045 A | 4/1998 | | |
| JP | S59106328 A | 6/1984 | | |
| JP | H06072202 A | 3/1994 | | |
| JP | 2010228603 A | 10/2010 | | |
| JP | 2013220677 A * | 10/2013 | | |
| KR | 200475520 Y1 | 12/2014 | | |
| KR | 101628579 B1 | 6/2016 | | |

\* cited by examiner

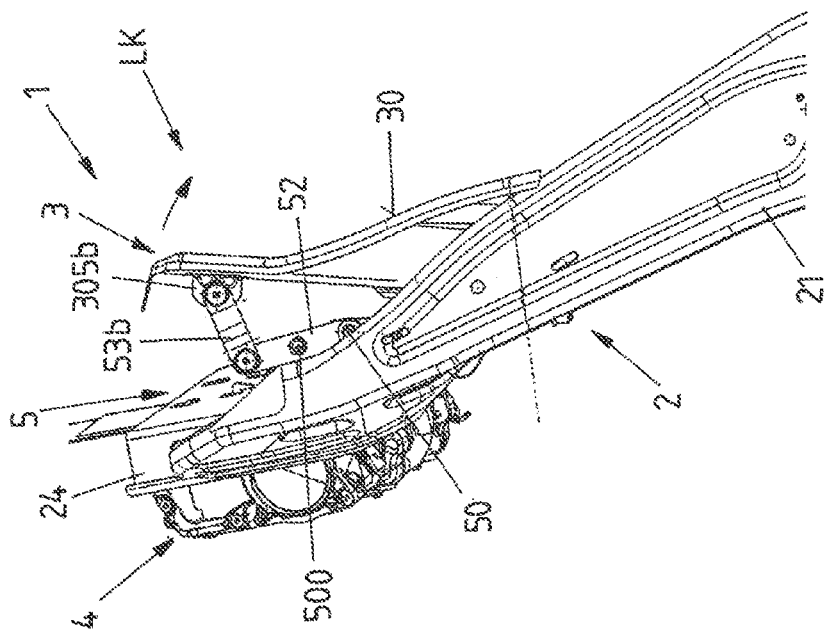
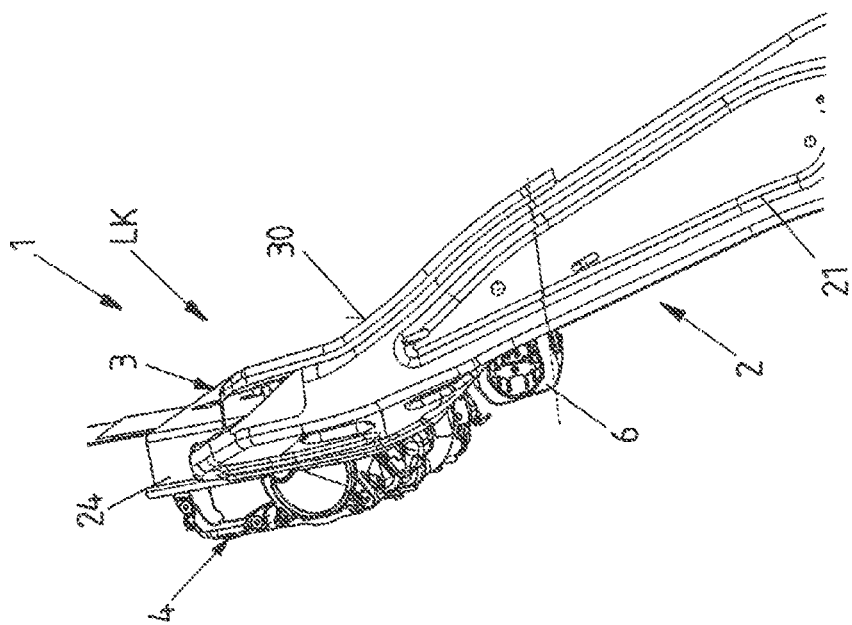

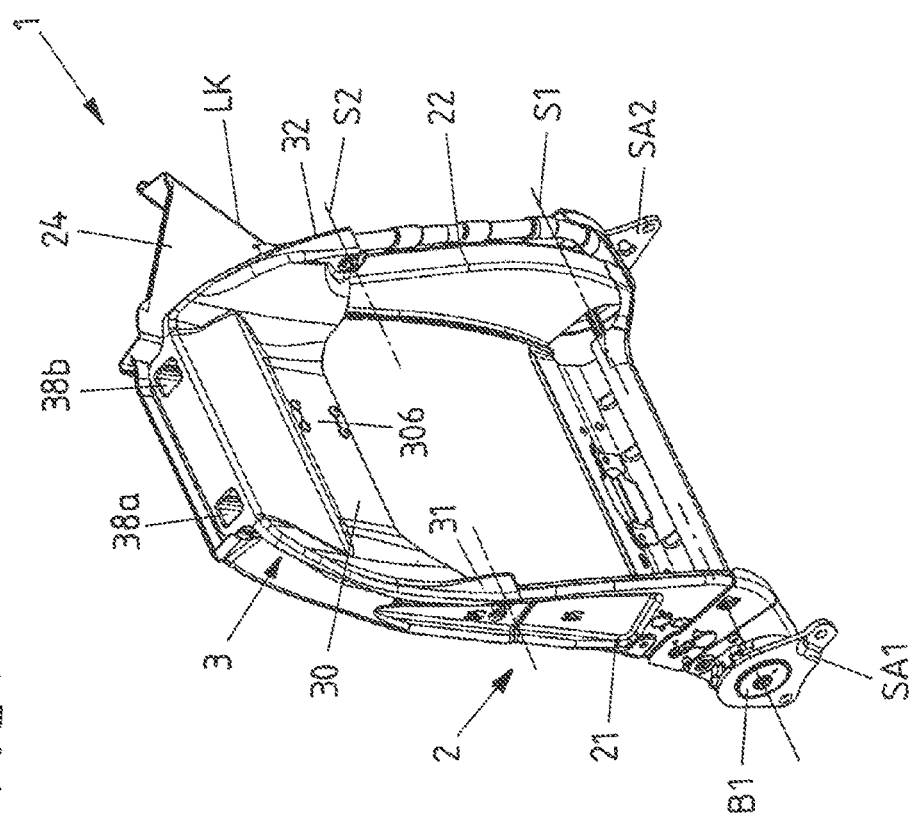

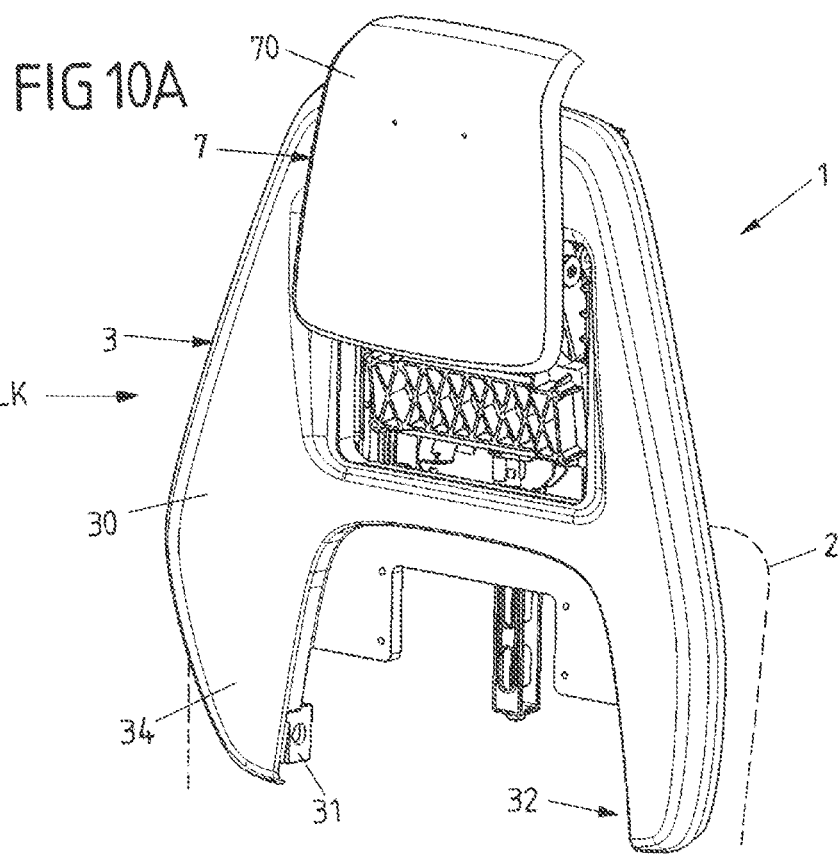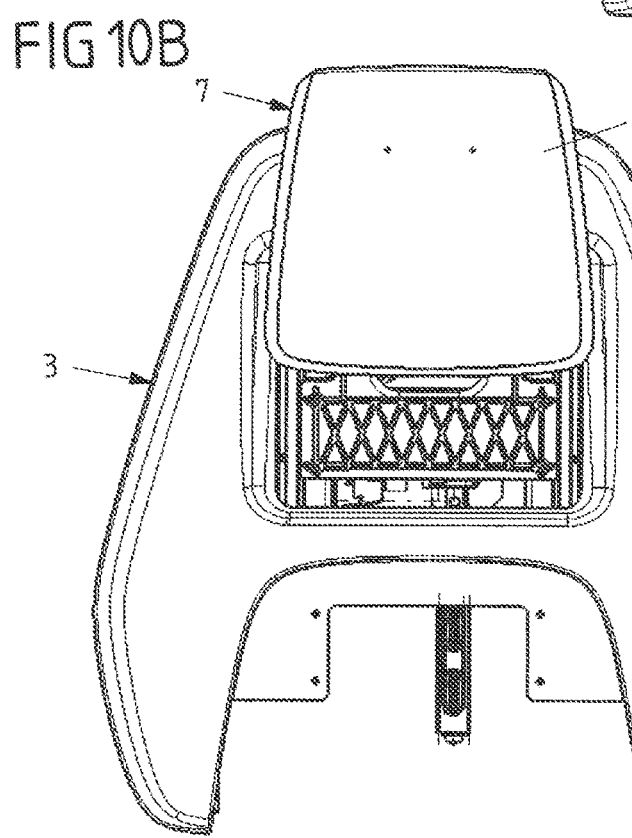

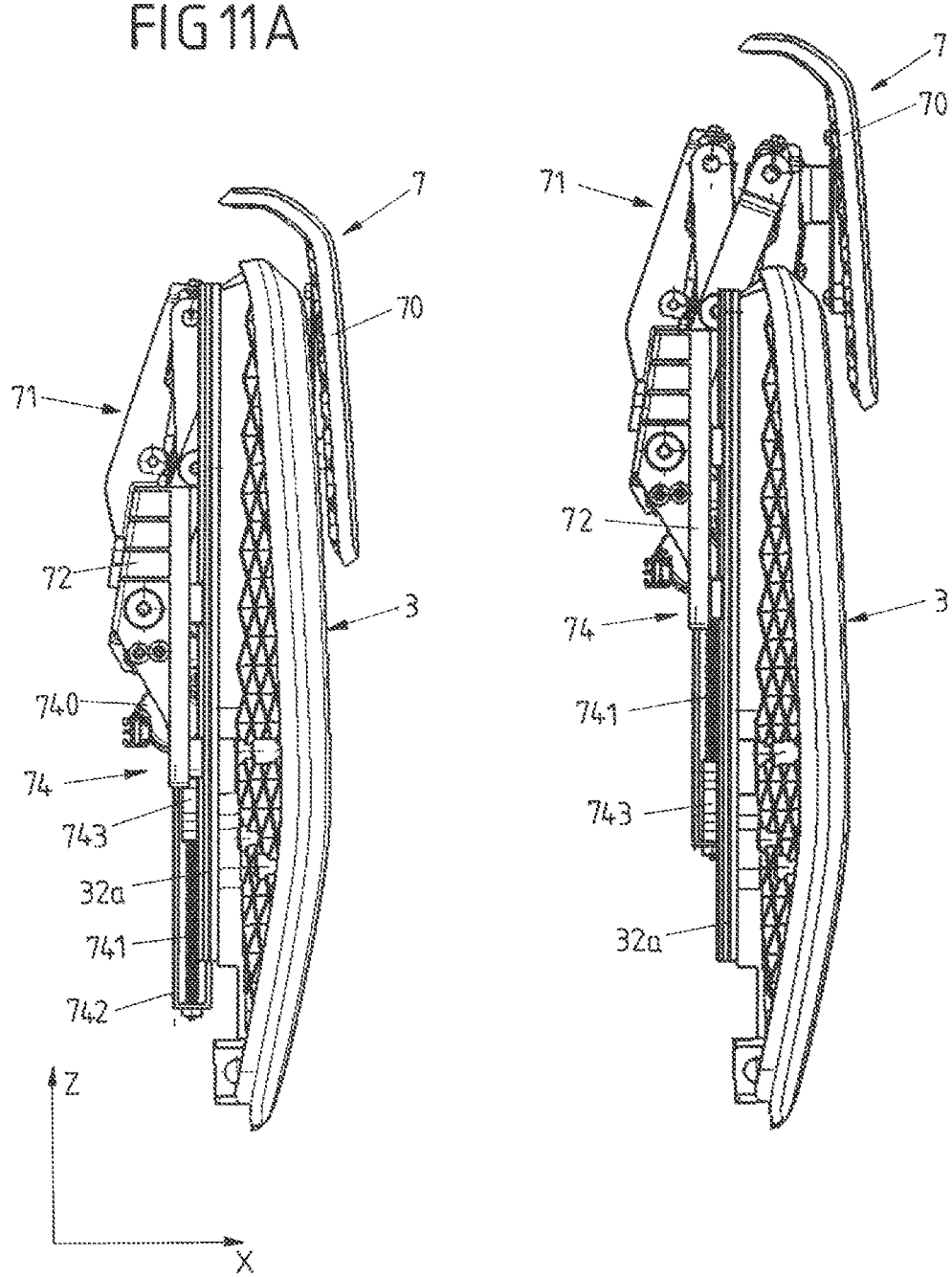

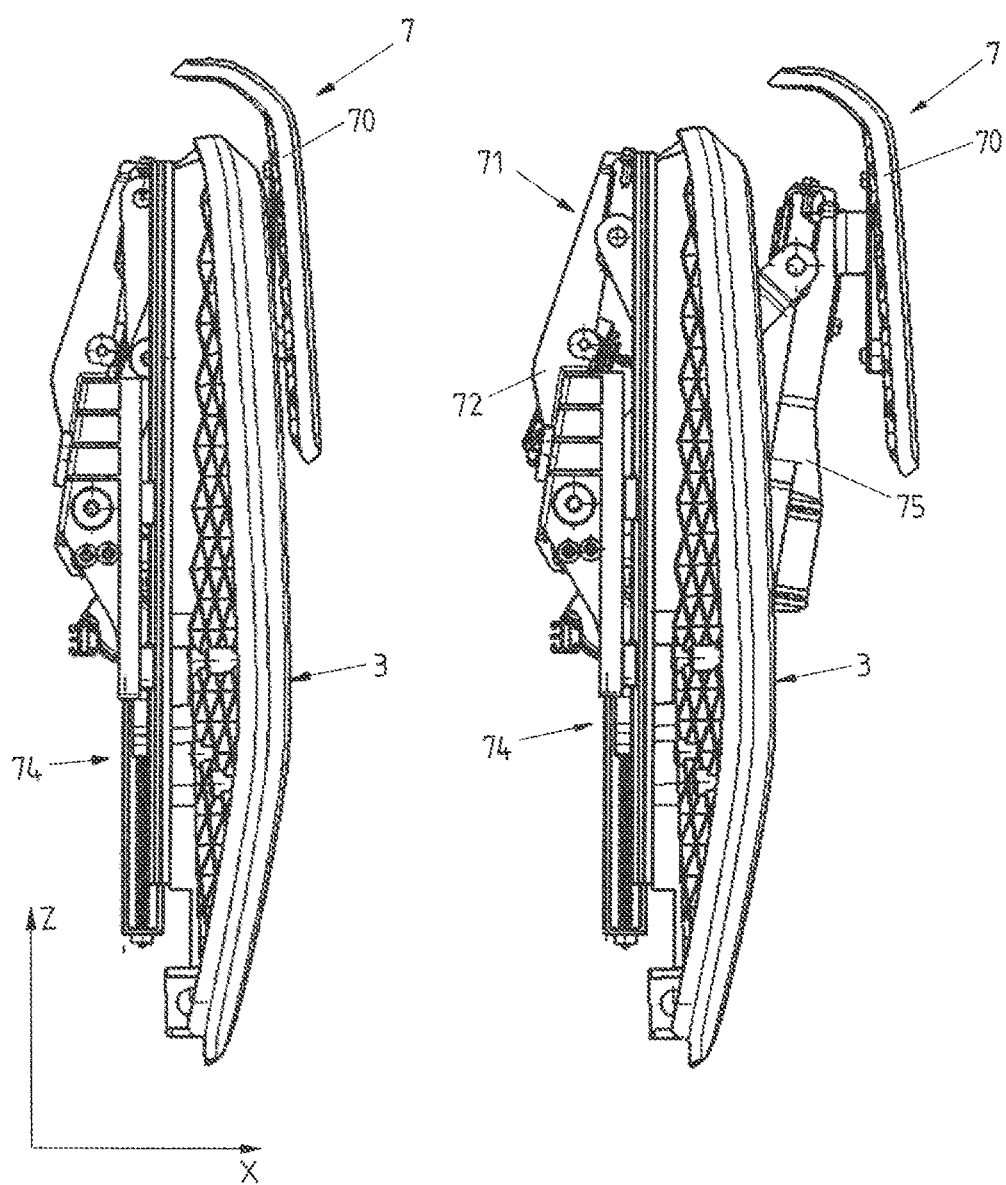

BACKREST FOR A VEHICLE SEAT, AND BACKREST HEAD MODULE

CROSS-REFERENCE TO RELATED APPLICATIONS

This application is the U.S. National Phase of PCT Application No. PCT/EP2019/065310 filed Jun. 12, 2019, which claims priority to German Patent Application No. DE 10 2018 209 438.1 filed Jun. 13, 2018, the disclosures of which are hereby incorporated in their entirety by reference herein.

TECHNICAL FIELD

The present disclosure relates to a backrest for a vehicle seat and a backrest head module use in a vehicle seat.

BACKGROUND

Backrests of vehicle seats are generally adjustable in their inclination with respect to a seat part. In addition, specifically in the case of equipment variants for luxury class vehicles, there is also the possibility of separately adjusting an upper region of the backrest, the backrest head, in its inclination. This adjustment is realized, for example, by a divided backrest frame or by a component additionally mounted on the backrest. The adjustment range is conventionally in the range of between 10° to 18°.

SUMMARY

The present disclosure may provide an improved backrest.

According to a first embodiment, a backrest for a vehicle seat is provided, including a backrest frame, on which a support element of a backrest head of the backrest, the support element being provided for supporting a seat user in a shoulder region, is mounted pivotably. The support element may be pivoted by external force via a drive unit arranged on the support element and a lever mechanism interacting with the drive unit.

By means of the combination of a drive unit, which is arranged on the support element, for the adjustment of the support element by external force, with a lever mechanism, which interacts with the drive unit, for converting an adjustment force produced by the drive unit into a pivoting movement of the support element, the adjustment mechanism for adjusting the support element may be constructed comparatively compactly. Furthermore, by means of the use of a lever mechanism, a force value and/or a force profile of the adjustment force acting on the support element during pivoting of the support element may be comparatively precisely defined and, depending on the desired configuration, may be simply varied by changing the length of levers used in the lever mechanism. Furthermore, a large pivoting range of 20° or more may also be readily realized for the support element of the backrest head by a lever mechanism.

The support element which is provided pivotably on the backrest frame has, for example, a support surface. This support surface is designed and provided for supporting at least part of a backrest cushion of the backrest and, in one variant embodiment, extends over a region of the backrest frame that is present between two backrest longitudinal sides of the backrest side parts defining the backrest. The support element may include, for example, a shield which forms the support surface and spans a central region of the backrest frame in the upper third of the backrest. A support surface of the support element thus permits flat contact of at least part of a backrest cushion of the backrest, on which a seat user—during correct use of the vehicle seat equipped with the backrest—is supported in the upper third of his/her back and consequently in the region of his/her shoulders.

In one or more embodiments, at least one drive element is adjustable in a translatory manner via the drive unit, the drive element transmitting an adjustment force produced by the drive unit to the lever mechanism for pivoting the support element by external force. Via the drive unit, for example, an electromotive drive unit, a drive element is consequently adjusted along a rectilinearly running drive axis in order to control pivoting of the support element on the backrest frame.

A translatory adjustment of the drive element may be converted into a pivoting movement of the support element via the lever mechanism. The lever mechanism is consequently configured to convert a translatory adjustment of the drive element into a pivoting movement of the support element. In this case, the lever mechanism is designed, for example, as part of a crank mechanism via which a rectilinear adjustment movement of the drive element along a drive axis may be converted into a pivoting movement of the support element about a pivot axis defined on the backrest frame. Accordingly, the lever mechanism may permit, for example, an adjustment of the support element on the basis of crank rocker kinematics.

In principle, the lever mechanism interacting with the drive unit may include at least one lever, which is coupled to the backrest frame. Consequently, such a lever may also be part of a crank mechanism, as has been explained above for one possible variant embodiment, in order to control a pivoting movement of the support element on the backrest frame by a drive element adjustable in a translatory manner by external force.

In one or more embodiments, the at least one lever which is coupled to the backrest frame is additionally coupled to a connecting element of the lever mechanism, the connecting element being mounted adjustably on the support element. The lever mechanism (and thus also a connecting element mounted adjustably on the support element) is conventionally provided on a rear side of the support element, which rear side faces away from a backrest cushion of the backrest. The connecting element may be coupled here to the support element, for example via a rotary bearing. Alternatively, the connecting element may be mounted displaceably on the support element. The connecting element may be a further coupled lever or part of a slotted guide mechanism.

As an example, in one or more embodiments the at least one lever which is coupled to the backrest frame is connected in an articulated manner to a connecting element coupled to the support element, it may be provided that the at least one lever of the lever mechanism, which lever is coupled to the backrest frame, is V-shaped. A V-shaped lever is understood here as meaning a lever which has two limbs running at an angle other than 180° with respect to each other. For example, the limbs of a V-shaped (pivot) lever of the lever mechanism are oriented at an angle in the range of 70° to 140° with respect to each other.

In one or more embodiments, a drive element which is adjustable in a translatory manner by the drive unit interacting with the lever mechanism in such a manner that an adjustment force produced by the drive unit for pivoting the support element by external force in the region of a buckling point of a V-shaped lever, at which buckling point the limbs defining the V shape of the lever are connected to each other, is transmitted to the V-shaped lever. Ends of the two limbs of the lever located on the other side of the buckling point are coupled, for example, in an articulated manner to the backrest frame or to the support element respectively. In other words, one end of the one limb is coupled to the backrest frame and the end of the other limb is coupled to the connecting element which, in turn, is connected in an articulated manner to the support element. An adjustment force introduced in the region of the buckling point and thus between the two coupled limb ends by a translatory adjustment of the buckling point thus leads automatically to a pivoting movement of the V-shaped lever and therefore to a pivoting movement of the support element, which is coupled to the lever, with respect to the backrest frame.

In the alternative variant embodiment which has already been discussed above and in which the connecting element is mounted displaceably on the support element, the connecting element may be mounted displaceably on the support element, for example, via at least one guide slot. This includes the fact that the connecting element is displaceable on the support element via two mutually opposite guide slots running parallel to each other. In the case of an adjustment force which acts on the lever mechanism and is produced by the drive unit, a slot-guided displacement of the connecting element along two guide slots provided on the support element thus takes place.

In principle, the lever mechanism interacting with the drive unit may include at least two levers which are each coupled to the backrest frame. Two supporting points and bearing points for the lever mechanism and for the support element which is adjustable via the latter are provided in this way on the backrest frame. The drive element may act here—for the synchronous adjustment of the lever coupled in each case to the backrest frame—on an element of the lever mechanism, via which element the at least two levers which are coupled to the backrest frame are connected to each other.

The element on which the drive element acts in order to transmit an adjustment force may be a connecting element which is mounted displaceably on the support element (for example via at least one guide slot). In one variant embodiment, the element on which the drive element acts in order to transmit the adjustment force to the lever mechanism is an element which is different from the connecting element. For example, in the case of levers which are each V-shaped, this element may in each case be provided in the region of a buckling point at which two limbs of a lever are connected to each other. In the case of the V-shaped levers which are in each case coupled at their ends, a rectilinearly running adjustment movement of the drive element thus result in a pivoting movement of the levers in order to pivot the support element forward or rearward on the backrest frame—with respect to a spatial direction pointing from the rear side for the preparation of the backrest.

In or more embodiments, the backrest has a retractor and consequently a belt retractor for a seat belt. The retractor is then provided, for example, on the backrest frame such that the support element is adjustable relative to the retractor. The backrest frame carrying the retractor may thus be configured independently of the support element and of the adjustment mechanism necessary for adjusting the support element. The backrest frame may be configured to be stiffer, for example, for the loads occurring on the backrest frame directly from a seat belt in the event of a crash because of the retractor, without this affecting the kinematics for adjustment the support element. The support element of the backrest head may thus be more simply configured in terms of optimization of weight and function although the retractor which is provided in the upper part of the backrest frame makes it necessary, for example, for the backrest frame to be stiffened.

In principle, the support element may be composed of metal, but may also be composed of a fiber composite material or plastic. Production of the support element from plastic is possible here if a retractor for a seat belt of the vehicle seat is integrated on the backrest and the loadings acting via the retractor do not have to be absorbed, or at most to a small extent, by the support element.

In one or more embodiments, the support element together with the drive unit and the lever mechanism is part of a backrest head module that may be mounted as a premanufactured construction unit on the backrest frame. Such a backrest head module may thus be preassembled as a pre-testable construction unit with at least the support element, the drive unit and the lever mechanism. The construction unit is subsequently mounted on the backrest frame, for example by only the support element still being provided pivotably on the backrest frame and parts of the lever mechanism being connected in an articulated manner to the backrest frame.

A pivot axis about which the support element may be pivoted with respect to the backrest frame may in principle be defined, for example, by a rotary bearing on at least part of the backrest frame, a rotary bearing which is provided on one of two opposite backrest side parts of the backrest, the backrest side parts conventionally defining backrest longitudinal sides of the backrest. Such a rotary bearing then may include, for example, a rotary journal or rotary pin of the backrest frame or of the support element, or a separate rotary bolt which is received rotatably in a rotary bearing opening of the support element or of the backrest frame.

In an alternative variant embodiment, the pivot axis of the support element is defined by at least one film hinge. The pivot axis for the support element, about which the support element may be pivoted on the backrest frame, is consequently predetermined here via a material joint. Since the pivot axis is defined by at least one film hinge, the position of the pivot axis for the support element of the backrest head may be predetermined comparatively flexibly on the backrest frame. It is thus not imperative for a rotary bearing to be formed for this purpose on the backrest frame itself.

In another embodiment, the pivot axis of the support element lies at a front edge of a backrest side part of the backrest frame. Alternatively or in addition, the at least one film hinge may be formed by a bearing portion of the support element, the bearing portion lying against a backrest side part of the backrest frame. If, consequently, an adjustment force for pivoting the support element is transmitted to the support element, the film hinge of the support element permits a pivoting movement to be carried out. In this case, the bearing portion may lie against a front edge of a backrest side part without the bearing portion having to be fixed on the backrest side part. The bearing portion may then be bent locally in the region of the film hinge in order to permit a pivoting movement of the support element about that part of the bearing portion which is supported on the backrest side part.

The use of a film hinge for defining a pivot axis of the support element is also independent here of the use of a drive unit and of a lever mechanism interacting therewith for adjustment of a support element of the backrest head by external force. Accordingly, according to a second aspect, a backrest for a vehicle seat is very generally proposed, comprising a backrest frame, on which a support element of a backrest head of the backrest, the support element being provided for supporting a seat user in a shoulder region, may be pivoted about a pivot axis, and the pivot axis is defined by at least one film hinge.

The possibility this provides of locating the pivot axis of the support element at a front edge of a backrest side part of the backrest frame in a simple manner may afford the advantage, for example, here that, when the support element is pivoted, a backrest cushion of the backrest, the backrest cushion being provided on the support element, is less greatly compressed (in comparison to a variant in which the pivot axis of the support element is spaced apart form the front edge of the backrest side part and thus lies further to the rear). Such a small compression of the cushion is of particular significance in conjunction with the support element being able to pivot in a greater pivoting range of more than 18°, or of more than 20°.

In another embodiment, it is provided that a headrest is provided on the support element and may be pivoted by pivoting of the support element. The support element may consequently carry a headrest for the vehicle seat. For example, the support element for this purpose has a carrying plate on which the headrest is secured.

The headrest provided on the support element may be a headrest which is adjustable relative to the support element. Thus, in one variant embodiment, a cushion carrier of the headrest may be arranged on the carrying plate of the support element. Such a cushion carrier may carry a headrest cushion of the headrest and may additionally be adjustable with respect to the carrying plate, for example in order to adjust the headrest cushion toward the head of a seat user or away from the latter.

In another embodiment, a backrest for a vehicle seat, that may include a backrest frame, on which a support element of a backrest head of the backrest, is provided. The support element being provided for supporting a seat user in a shoulder region, is mounted pivotably, wherein a headrest is provided on the support element, the headrest being adjustable relative to the support element. The backrest may be developed in accordance with any desired aspect or any desired variant embodiment described here.

By this means, firstly, a headrest which may be adjusted particularly comfortably is possible. Furthermore, the pivotability of the support element is not restricted by the position of the headrest, and therefore pivoting ranges of 20° or more may be provided in a particularly comfortable manner. During the adjustment, at least part of the headrest is moved relative to the support elements, such as a part which provides a support surface for the head of a seat user.

The headrest is optionally adjustable relative to the support element in two directions. The two directions run, for example, perpendicularly to each other, for example, substantially in the X and in the Y direction of the system of coordinates of the vehicle (with respect to a state of the backrest in which it is installed in the vehicle). The adjustment in the one direction is independent of the adjustment in the other direction. By means of the adjustability in two directions, it is possible to always adapt the position of the headrest particularly readily to the height of a seat user, specifically even in the case of different adjustments of the inclination of the backrest relative to a seat part of the vehicle seat.

At least one rail may be provided, for example mounted, fixedly on the support element. The headrest may be mounted adjustably relative to the support element on the rail. For example, the rail is screwed onto the support element. Optionally, two rails are provided. The headrest is adjustable, for example in the Z direction, on the rail or the rails. A plurality of sliders may be provided per rail, the sliders being in engagement with the respective rail.

Optionally, the rail reinforces (the rails reinforce) the support element, for example stiffens (stiffen) same. The support element may thus be configured to be lighter in weight per se, for example with less material being used. The rail thus has a double use and permits adjustability of the headrest and reinforcement of the support element. For this purpose, the rail is configured and connected to the support element in such a manner that it may absorb forces introduced into the support element.

For example, the rail is injected or inset molded on the support element or formed thereon. The rail is produced, for example, from metal, aluminum, and, in an injection molding process, is at least partially covered with material in such a manner that the rail is fixedly connected to the support element. Particularly stable embodiments are thereby possible. Alternatively, the rail itself is (the rails themselves are) sprayed onto the support element, for example formed in the same material as the support element or part of the support element, for example from an injection molding material, a plastic. This permits an embodiment which is particularly lightweight and may be produced in a simple manner.

An element of the headrest (for example a headrest pad or the like) may be connected to the support element via scissors kinematics. By means of the scissors kinematics, for example, an adjustment in the X direction is possible. The element is thereby moved in the X direction relative to the support element. The scissors kinematics may include at least two levers mounted pivotably on one another. A particularly stable and precise adjustment is thereby possible, the adjustment also permitting an adjustment movement along a straight line.

The headrest optionally may include a carrier which is mounted displaceably on the at least one rail (such as on the pair of rails), for example by means of one or more sliders. In addition, the scissors kinematics may be coupled to the carrier. For this purpose, for example, the two levers which are mounted pivotably on each other at a point are each mounted pivotably on the carrier at a distance from the point.

A drive mechanism for adjusting the scissors kinematics may be mounted on the carrier. The drive mechanism comprises, for example, a motor which is mounted on the carrier. By this means, a particularly space-saving embodiment is possible because a space behind the headrest may be used in order to arrange the drive mechanism or at least some parts thereof.

Alternatively or additionally, a drive mechanism for adjusting the carrier relative to the support element is provided, the drive mechanism being mounted, for example, on the carrier. The drive mechanism may also comprise a motor which is mounted on the carrier. This likewise permits a space-saving embodiment and particularly simple wiring.

In another embodiment, a backrest head module, already discussed above is provided. The backrest head module may be for use in a backrest which is provided for a vehicle seat. Such a backrest head module may be mounted as a premanufactured construction unit on a backrest frame of the backrest and, in addition to a support element provided for supporting a seat user in a shoulder region, may include a drive unit arranged on the support element and a lever mechanism interacting with the drive unit for the pivotable mounting on the support element on the backrest frame and/or a headrest which is adjustable relative to the support element.

As already explained above, a backrest head module may permit more rapid and efficient installation of a support element, which is to be provided adjustably on a backrest frame, of a backrest head by the backrest head module being able to be already preassembled separately and tested.

With the solution proposed, a vehicle seat is furthermore also provided which has a variant embodiment of a proposed backrest or a variant embodiment of a proposed backrest head module.

BRIEF DESCRIPTION OF THE DRAWINGS

The attached figures illustrate by way of example possible variant embodiments of the proposed solution.

In the figures:

FIGS. 5A-5B show, in a side view and in part, the backrest with the shield in the two pivoting positions of FIGS. 2A and 2B;

FIG. 9 shows, in a perspective view, a further variant embodiment of a proposed backrest, in which a headrest may be mounted separately on a shield as support element;

FIGS. 10A-10C show various views of a further variant embodiment of a proposed backrest, in which a headrest is mounted adjustably on a shield as support element;

FIGS. 11A-11D show side views of the shield of the backrest according to FIGS. 10A-10C with the headrest in various adjustment positions relative to the shield;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
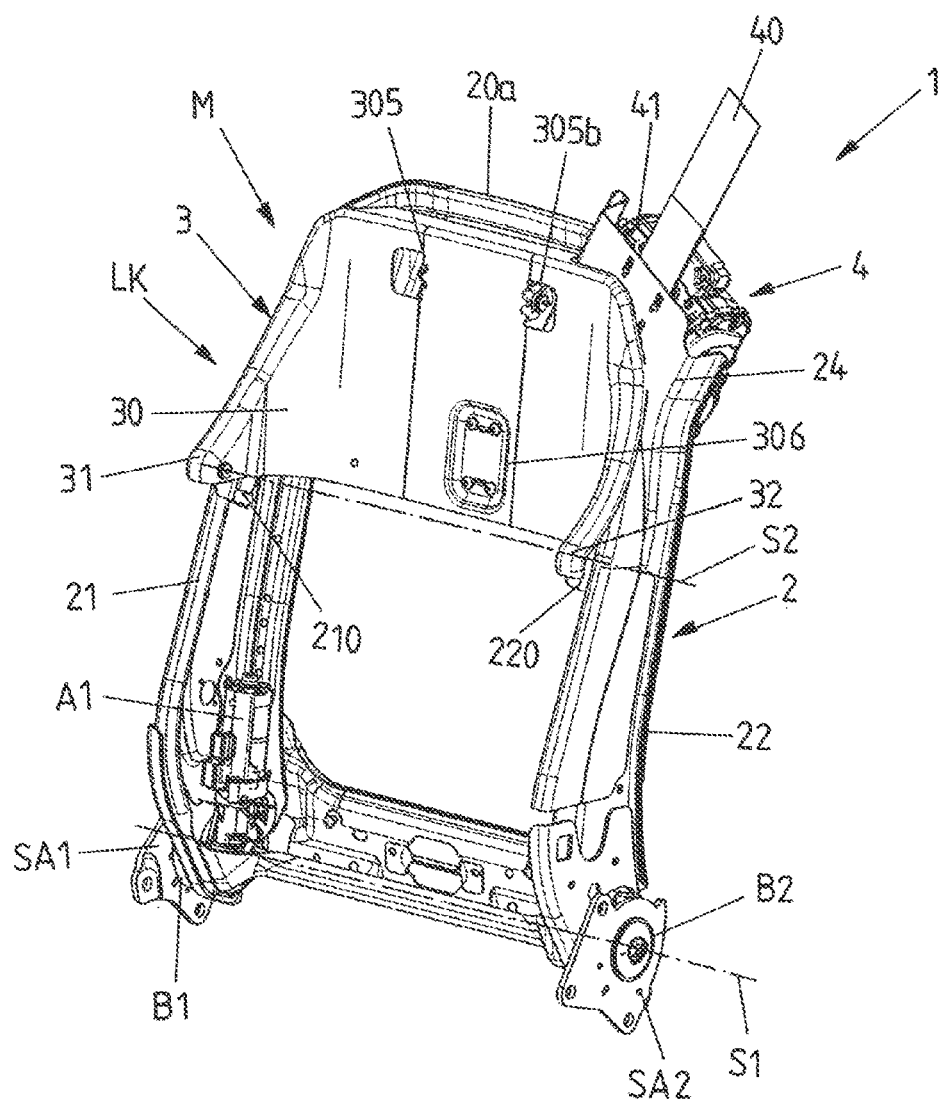
FIG. 1 shows, in a perspective view and looking at a front side, a first variant embodiment of a proposed backrest with a support element which is mounted pivotably on a backrest frame and is configured as a shield.
Figure 2B:
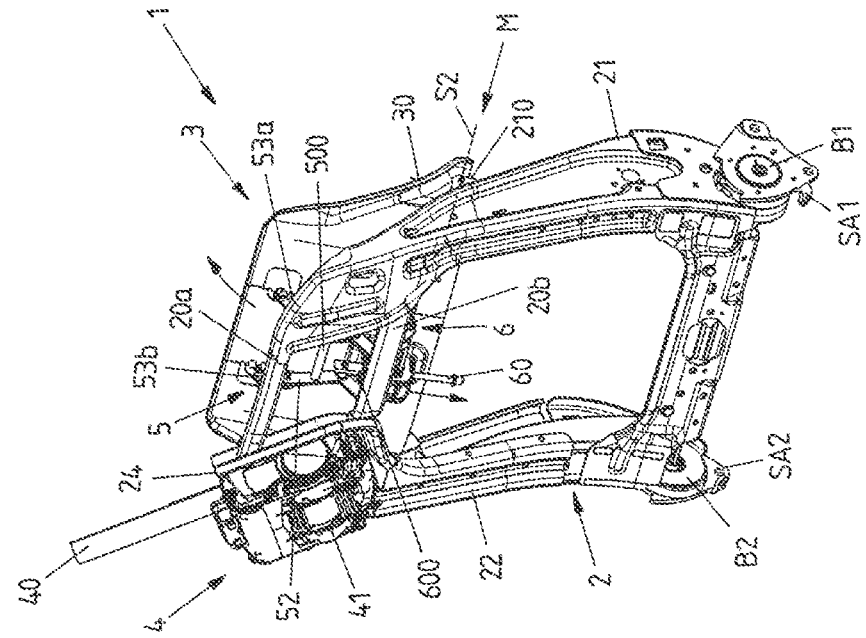
FIGS. 2A-2B show, looking at the rear side of the backrest, the shield in two different pivoting positions.
Figure 2A:
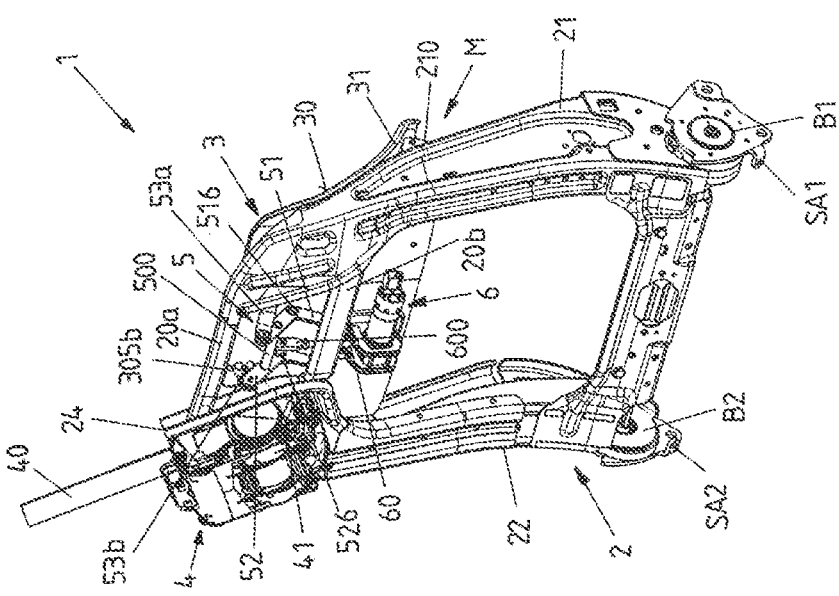
Figure 3:
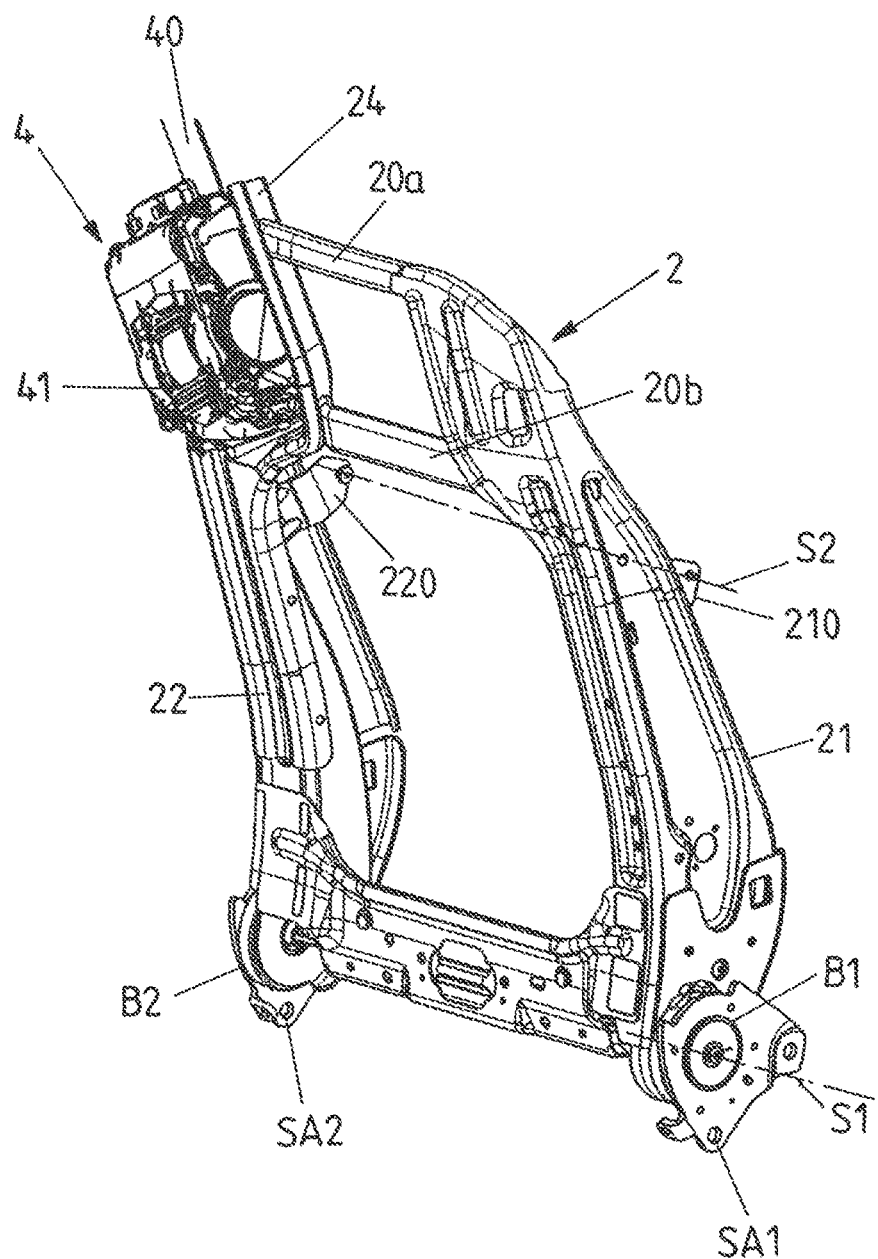
FIG. 3 shows the backrest frame of the backrest of FIGS. 1 to 2B without the shield and only with a retractor provided thereon for a seat belt.

FIG. 1 shows a variant embodiment of a backrest 1 which may be mounted via fittings B1, B2 on a seat underframe so as to be pivotable about a pivot axis S1. For this purpose, side part adapters/fitting parts SA1, SA2 of the fittings B1 and B2 are fixed to a seat underframe of a vehicle seat. Via an electromotive drive A1 interacting with a fitting B1, the backrest 1 may then be set by external force in its inclination with respect to the seat underframe about the pivot axis S1 and optionally may also be folded forward into a loading position and back again. It may also be provided that the backrest 1 may be pivoted on the vehicle seat to the rear about the pivot axis S1 into a reclining position.

A backrest frame 2 of the backrest 1, on which backrest frame, for example, the drive A1 is arranged and the fittings B1 and B2 are provided, may include two backrest side parts which define backrest longitudinal sides and are in the form of backrest struts 21 and 22. The mutually opposite backrest struts 21 and 22 are connected to each other at an upper end of the backrest frame 2 via an (upper) crossmember 20a.

A retractor 4 for a seat belt 40 is provided in the region of the crossmember 20a and assigned to one of the backrest struts 21, 22 (to the right backrest strut 22 in the variant embodiment of FIG. 1). The backrest frame 2 thus integrates the retractor 4, which may include a retractor drive 41 for tensioning the seat belt 40, such as in the event of a crash. The backrest frame 2 forms a retractor receptacle 24 for fixing the retractor 4 to the backrest frame 2. Loading occurring because of the retractor 4 and the seat belt 40 are thus absorbed via the backrest frame 2 which is designed therefor.

In the upper third of the backrest frame 2, a backrest head LK having an adjustable support element in the form of a shield 3 is provided for supporting a seat user in the region of the shoulders. The shield 3 forms a support surface 30 which at least partially covers a clearance between the two backrest struts 21 and 22 and permits flat contact and therefore support of a backrest cushion (not illustrated here) of the backrest frame 1.

The shield 3 of the backrest head LK is pivotable on the backrest frame 2 about a pivot axis S2 in order to be able to adjust the shield 3 in a pivoting range in accordance with the illustrations of FIGS. 2A-2B or 5A-5B. As is apparent from the overall view of FIGS. 1, 2A-2B, 3, 4A-4B and 5A-5B, the shield 3 which is composed of metal, a fiber composite material or of plastic is mounted pivotably here on the backrest struts 21, 22. For example, for this purpose, bearing tabs 210, 220 defining rotary bearings are provided on the backrest struts 21, 22. The bearing tabs 210, 220 may be formed by the backrest struts 21, 22 or may be fixed thereon.

An electromotive drive unit 6 and a lever mechanism 5 interacting therewith are provided for a pivoting movement of the shield 3 about the pivot axis S2, which is defined on the backrest frames 21 and 22, by external force. The drive unit 6 is fixed on a rear side of the shield 3 facing away from the backrest cushion to a fastening region 306, which is provided for this purpose, of the shield 6. An adjustment force produced by the drive unit 6 may be converted into a pivoting movement of the shield 3 about the pivot axis S2 via the lever mechanism 5, which is connected to the backrest frame 2 and to the shield 3. The lever mechanism 5 operates here according to the principle of a crank rocker and thus forms a coupling mechanism for converting a translatory adjustment of a drive element, which is driven by the drive unit 6 and is in the form of a drive rod 60, into a pivoting movement of the shield 3.

For this purpose, the lever mechanism 5 may include two V-shaped pivoting levers 51 and 52. The pivoting levers 51 and 52 which are connected rigidly to each other via a coupling rod 500 are each mounted pivotably on the backrest frame 2, specifically on a lower crossmember 20b. The lower crossmember 20b connects the two backrest struts 21, 22 to each other below the upper crossmember 20a. The two pivoting levers 51, 52 are coupled to the backrest frame 2 at one end of one of two limbs 51.1, 51.2 or 52.1, 52.2 of the respective pivoting lever 51, 52, the limbs defining the V shape, and thus on the other side of a buckling point 516 or 526 of the respective pivoting lever 51, 52 at which the two limbs 51.1, 51.2 or 52.1, 52.2 defining the V shape are connected to each other.

The respective limbs 51.2 or 52.2 of a pivoting lever 51 or 52 that are not coupled to the backrest frame 2 are in each case connected in an articulated manner to a connecting element in the form of a connecting lever 53a, 53b of the lever mechanism 5. One lever end of the connecting lever 53a, 53b is in each case on one end coupled to a pivoting lever 55 or 56 and the other end is coupled to a connecting portion 35a, 35b on the rear side of the shield 3. The connecting portion of the shield 3 is formed here by a connecting tab 305a, 305b which protrudes on the rear side of the shield 3 and optionally projects rearwards. On the other side of the pivot axis S2 and offset upward with respect to a longitudinal direction of the backrest 1, the shield 3 is coupled to the backrest frame 2 via two interconnected pairs of levers 51, 53a and 52, 53b, wherein a pivoting lever 51 or 52 of the pair of levers is in each case coupled to the backrest frame 2 and another lever 53a or 53b is coupled to the shield 3, and the two levers of a pair of levers 51, 53a or 52, 53b are connected in an articulated manner to each other.

The drive rod 60 which is adjustable in a translatory manner via the drive 6 has a rod head 600. The rod head 600 is connected to a coupling element in the form of a connecting rod 50 (compare FIG. 5B) which, in turn, is secured at the buckling points 516 and 526 of the two pivoting levers 51 and 52. If consequently, as illustrated, for example, in FIGS. 2A-2B and 5A-5B, the drive rod 60 is adjusted along a rectilinearly running drive axis with the aid of the drive unit 6, the rod head 600 carries along the connecting rod 50. By this means, at the buckling points 516 and 526, an adjustment force is introduced into the two pivoting levers 51, 52 of the lever mechanism 5, the adjustment force leading to a torque being exerted on the pivoting levers 51 and 52 about the hinge point defined on the backrest frame 2. The pivoting levers 51, 52 are consequently pivoted by the adjustment movement of the drive rod 60 in one of two possible pivoting directions.

The shield 3 is pivoted on the backrest frame 2 about the predetermined pivot axis S2 via the hinge connection to the connecting levers 53a and 53b, which are coupled to the rear side of the shield 3. For example, in the case of a translatory adjustment of the drive rod 60 downward with respect to the longitudinal direction of the backrest, the shield 3 is pivoted forward about pivoting axis S2 from an inoperative position illustrated in FIGS. 2A and 5A. The maximum possible pivoting angle here and also the force value acting on the shield 3 and a profile of the acting adjustment force are predetermined here via the lengths of the limbs 51.1-52.2 of the pivoting levers 51, 52 and the lever lengths of the connecting levers 53a and 53b. A pivoting angle range of the shield 3 and of the backrest head LK formed by this means of more than 20°, currently considered advantageous for autonomously driving vehicles, is readily possible therewith.

Figure 4A:
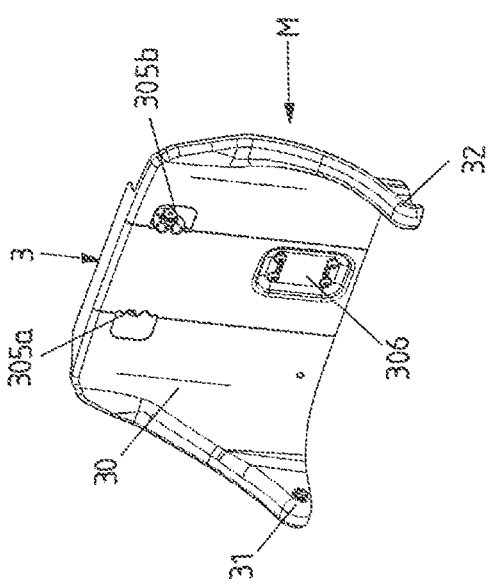
FIGS. 4A-4B show, in different views, a backrest head module with the shield, with an electromotive drive unit and with a lever mechanism for installing on the backrest frame of FIG. 3.
Figure 4B:
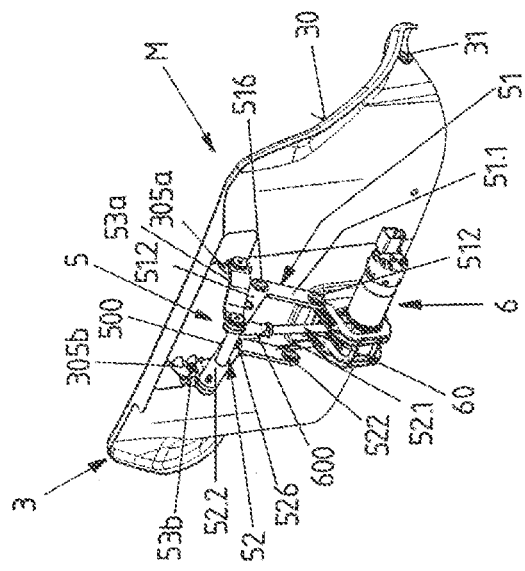

The shield 3 together with the electromotive drive unit 6, which is fixed on the rear side of the shield 3, and with the lever mechanism 5 interacting with the drive unit 6 forms a premanufactured backrest head module M, which is illustrated in an individual view in FIGS. 4A and 4B. The backrest head module M forms a preassembly and pretestable construction unit which may then be mounted on the backrest frame 2 in FIG. 3. All that then needs to be done here is for lateral bearing portions in the form of bearing arms 31 and 32 of the shield 3 to be fastened pivotably to the backrest struts 21, 22, for example to the bearing tabs 210, 220 for defining the pivot axis S2, and for the pivoting levers 51 and 52 of the lever mechanism 5 to be coupled at the free ends of their limbs 51.1 and 52.1 to the backrest frame 2 (here to the lower crossmember 20b). For the articulated connection to the backrest frame 2, hinge points 512 and 522 corresponding to the pivoting levers 51 and 52 are provided on the limbs 51.2 and 52.2 (cf. FIG. 4B).

Figure 6B:
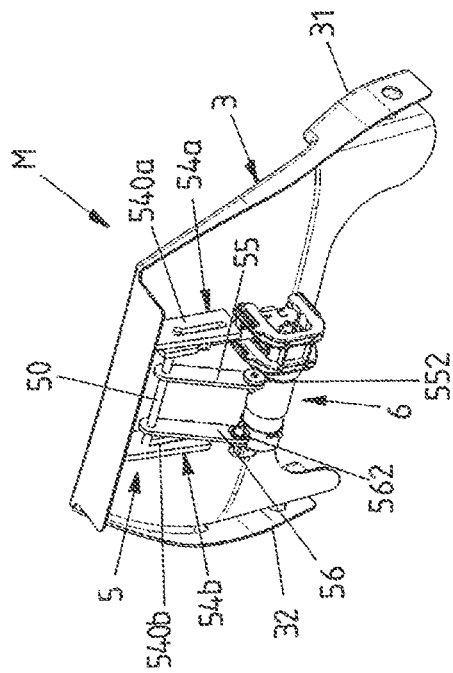
FIGS. 6A-6B show, in various views, with the shield mounted on the backrest frame (FIG. 6A) and in an individual illustration as part of the backrest head module (FIG. 6B), a variant embodiment of the proposed solution with a differently configured lever mechanism which may include a slotted guide mechanism.
Figure 6A:
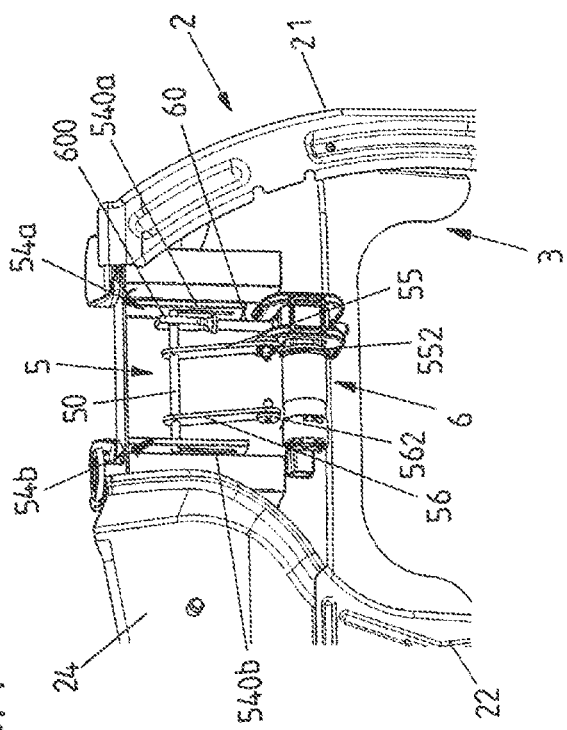

In the variant embodiment of FIGS. 6A and 6B, a solution with a slotted guide mechanism is provided on the rear side of the shield 3 instead of a rotary mounting of the connecting levers 53a, 53b of the lever mechanism 5. In this case, slotted guide parts 54a, 54b are provided on the rear side of the shield 3, for example are fixed on the rear side of the shield 3 or formed thereon. The slotted guide parts 54a, 54b each have a guide slot 540a or 540b. The guide slots 540a and 540b of the mutually opposite slotted guide parts 54a and 54b are formed here in a manner running parallel to each other.

An end of a connecting element in the form of a guide rod 50 engages in each case in a guide slot 540a or 540b. The respective end of the guide rod 50 is guided displaceably here in the elongate guide slot 540a or 540b. Lever ends of two pivoting levers 55 and 56 of the lever mechanism 5 are in turn connected to the guide rod 50 between the two slotted guide parts 54a and 54b. The pivoting levers 55 and 56 are in each case coupled here to the guide rod 50. The pivoting levers 55 and 56 of elongated (and consequently not V-shaped) design in the embodiment of FIGS. 6A and 6B are coupled to the backrest frame 2 on the other side of the guide rod 50, for example likewise to the lower crossmember 20b. For this purpose, each pivoting lever 55, 56 at the free lever end that is not connected to the guide rod 50 in each case forms a hinge point 552 or 562 for the backrest frame connection.

The rod head 600 of the drive rod 60 acts on the guide rod 50 such that, in the event of a translatory adjustment movement of the drive rod 60 that is controlled by the drive unit 6, the guide rod 50 is displaced along the guide slots 540a and 540b on the shield 3. The pivoting levers 55 and 56 which are connected here to the guide rod 50 and are thereby carried along are then consequently pivoted on the backrest frame 2 about their rotary bearing (above the pivot axis S2) and thus lead to a pivoting movement of the shield 3 about its pivot axis S2 defined on the backrest struts 21 and 22.

Figure 7A:
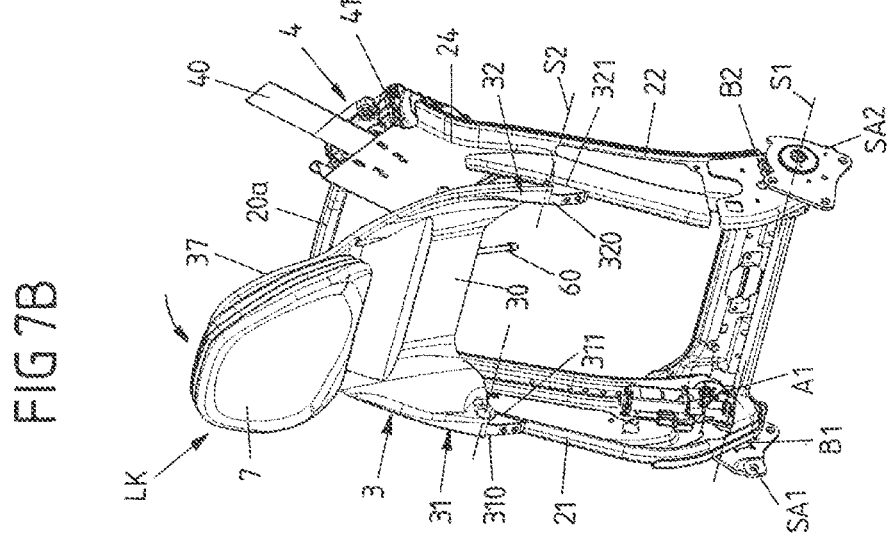
FIGS. 7A-7B show, looking at the front side of the backrest, a further variant embodiment, in which the shield carries as headrest and a pivot axis for the shield is predetermined by two film hinges.
Figure 7B:
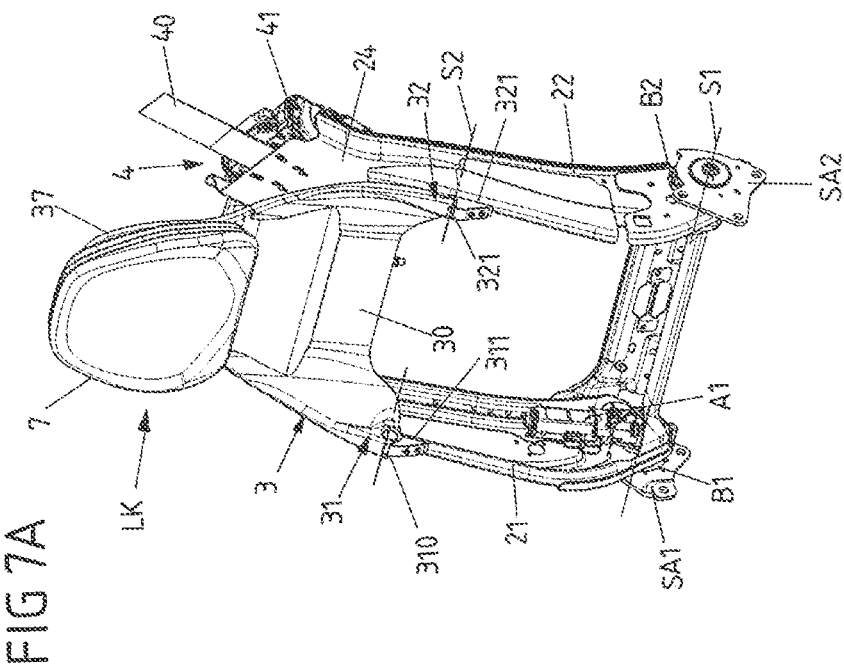

Within the scope of a possible development according to FIGS. 7A and 7B, the shield 3 may also carry a headrest 7 of the vehicle seat. In the variant embodiment of FIGS. 7A and 7B, the shield 3 for this purpose forms a carrying plate 37 for example above the support surface 30. A headrest cushion may be provided on the carrying plate 37. Alternatively, a cushion carrier of the headrest 7 may be arranged on the carrying plate 37. Such a cushion carrier may carry a headrest cushion of the headrest 7 and may additionally be adjustable with respect to the carrying plate 37, for example in order to adjust the headrest cushion toward the head of a seat user or away therefrom.

As an example, the headrest 7 may have a headrest cushion which is adjustable by external force, for example via an electromotive drive unit integrated on the carrying plate 37 or on the headrest carrier.

In the variant embodiment of FIGS. 7A and 7B, irrespective of the provision of the headrest 7 on the shield 3, the pivot axis S2 for the shield 3 is not defined by two rotary bearings on the backrest struts 21 and 22. On the contrary, the pivot axis S2 is defined here on the two backrest longitudinal sides in each case by means of a material hinge in the form of a film hinge 310, 320 on a bearing arm 31 or 32 of the shield 3.

Figure 8A:
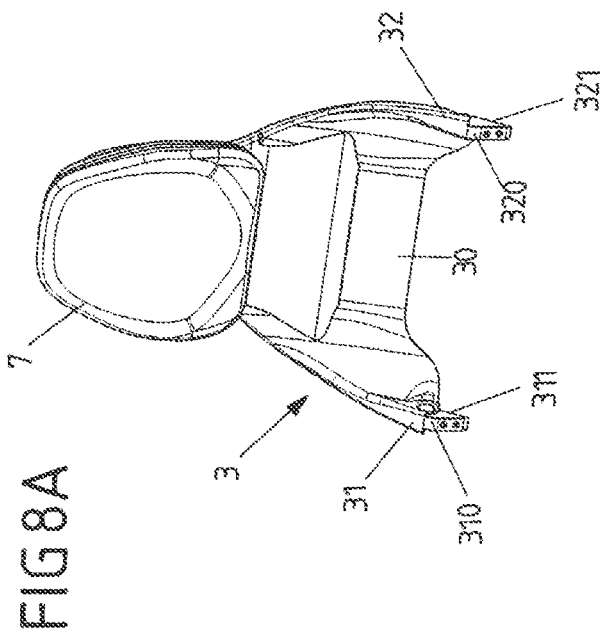
FIGS. 8A-8B show, in various views, the shield with the headrest provided thereon.
Figure 8B:
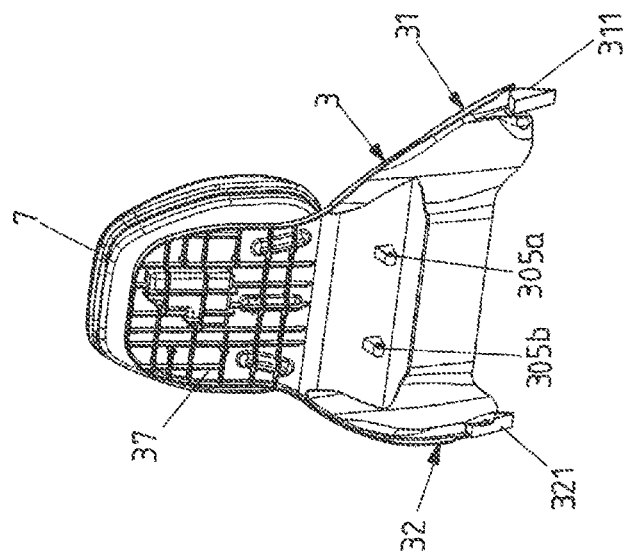

As is also illustrated, for example, in the individual view of FIGS. 8A and 8B, each bearing arm 31, 32 has a resting portion 311 or 321, via which the respective bearing frame 31 or 32 rests on a front side of an associated backrest strut 21 or 22. The shield 3 is thus supported on the backrest struts 21 and 22 via the resting portions 311 and 321 of the bearing arms 31 and 32. If, via the electromotive drive 6, an adjustment force for pivoting the shield 3 forward with respect to the upper crossmember 20a via the lever mechanism 5 is transmitted to the shield 3, the film hinges 310 and 320 of the bearing arms 31 and 32 permit such a pivoting movement. In this case, the material of the bearing arms 31, 32 is reversibly deformed at a bending point defined via the film hinges 310, 320 such that the shield 3 may be pivoted with the support surface 30 with respect to the resting portions 311 and 321 supported on the backrest struts 21 and 22.

The pivot axis S2 defined via the film hinges 310 and 320 is present at the front edges of the backrest struts 21 and 22 and therefore close to a backrest cushion of the backrest. The arrangement of the pivot axis S2 at the front edge has the result that the backrest cushion which is provided in the region of the backrest head LK is scarcely compressed during the forward pivoting of the shield 3, even if the shield 3 is pivoted forward by a comparatively large pivoting angle of more than 20°. The pivot axis S2 is therefore placed onto the front side of the backrest frame 2 via the film hinges 310 and 320 of the shield 3, as a result of which the cushion is compressed comparatively little even in the event of large pivoting angles.

In the variant embodiment of FIG. 9, the shield 3 likewise carries a headrest of the vehicle seat. However, instead of a carrying plate 37 above the support surface 30, the shield 3 in this variant embodiment has merely a headrest intersection with headrest sleeves 38a and 38b. It is thus possible, for example, for a conventional headrest to be mounted onto the shield 3, which is mounted pivotably on the backrest frame 2, the headrest, analogously to the variant embodiment of FIGS. 7A to 8B, being shifted when the shield 3 is pivoted, for example, relative to a retractor 4 provided at the retractor receptacle 24 of the backrest frame 2.

Figure 10C:
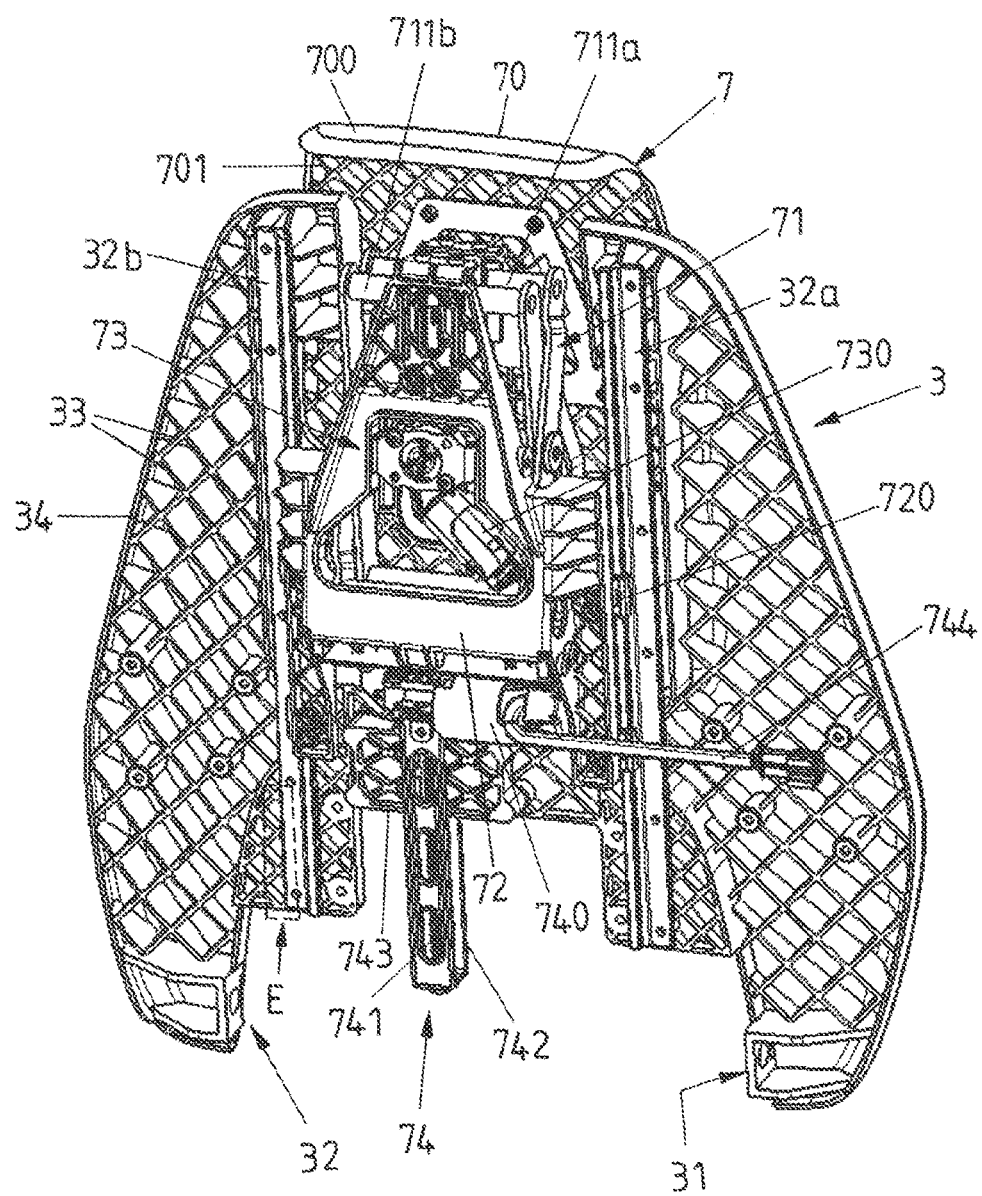

FIGS. 10A to 10C show a variant embodiment of a backrest 1 with a backrest frame 2 and a backrest head LK having an adjustable support element in the form of a shield 3. The backrest frame 2, which is illustrated by dashed lines here, is designed, for example, in accordance with one of the above-described figures. The shield 3 is mounted on the backrest frame 2 so as to be pivotable about a pivot axis via bearing portions 31, 32. The bearing portions 31, 32 each comprise a bearing receptacle for the pivotable connection to the backrest frame 2. Furthermore, in the example shown, the bearing portions 31, 32 are designed in the form of (downwardly) protruding bearing arms. In order to pivot the shield 3 in relation to the backrest frame 2, the vehicle seat 1 according to FIGS. 10A-10C may include, for example, the above-described drive unit 6 and the lever mechanism 5 interacting therewith.

A retractor receptacle is arranged, for example according to FIGS. 7A and 7B, on the backrest frame 2, or alternatively the vehicle seat with the backrest 1 does not comprise a belt retractor and the latter is provided, for example, on the chassis of the vehicle with the vehicle seat.

The shield 3 is (partially) ribbed in the force flux. The shield 3 is in general, for example, a plastics part and may be produced, for example, in an injection molding operation or may include a flat material onto which the stiffening ribs 33 shown in FIG. 10C are sprayed. The shield 3 shown in FIGS. 10A-10C may include a section of composite material, specifically an organosheet 34, onto which stiffening ribs 33 are sprayed (on the rear side). An organosheet may include endless fibers which are embedded in a thermoplastics matrix.

The shield 3 forms a support surface 30 which permits flat contact and therefore support of a backrest cushion (not illustrated here) of the backrest 1 (and which, for example, at least partially covers a clearance between two backrest struts).

A headrest 7 is provided on the shield 3, the headrest being adjustable relative to the shield 3. The headrest 7 is integrated directly in the backrest head. The headrest 7 may include a headrest pad 70 which forms a contact surface for the head of a seat user. By adjustment of the headrest 7, the headrest pad 70 may be adjusted forward and back, and also up and down, as will be explained in more detail below with respect to FIGS. 11A to 12D. The headrest pad 70 may include a piece of organosheet 700 onto which stiffening ribs 701 are sprayed (on the rear side). Alternatively, the headrest pad 70 is, for example, (entirely) a plastics injection molded part.

The headrest pad 70 is mounted on a carrier 72 via scissors kinematics 71. The carrier 72 is mounted in a longitudinally displaceable manner on a pair of rails 32a, 32b. For this purpose, the carrier 72 may include, per rail 32a, 32b, two sliders 720 (in the form of sliding blocks) which are in engagement with the respective rail 32a, 32b. The rails 32a, 32b are fastened to the shield 3. In the present case, the rails 32a, 32b are screwed to the shield 3, with it alternatively or additionally also being conceivable to fasten the rails 32a, 32b to the shield 3 by means of injections E or insert moldings. One such injection E is illustrated by way of example with dashed lines in FIG. 10C. The rails 32a, 32b are manufactured from metal, in the present case from aluminum. The rails 32a, 32b are each rectilinear and are oriented here in each case along the main direction of extent of the shield 3. The rails 32a, 32b not only guide the headrest 7 but also serve for stiffening the shield 3. Together with the shield 3, the rails 32a, 32b form a supporting structure of the upper backrest part with respect to the backrest frame 2. As an alternative to rails 32a, 32b, tubes are also conceivable. The rails 32a, 32b and the sliders 720 are optionally designed in each case as an IGUS linear guide system.

In order to adjust the headrest 7 along the rails 32a, 32b, the backrest frame 1 may include a drive mechanism 74. The drive mechanism 74 may include a motor 740 which is mounted on the carrier 72. The motor 740 is activated via a connection cable 744. The motor 740 is configured to set a spindle 741 (which is oriented parallel to the rails 32a, 32b) into rotation relative to the carrier 72. The spindle 741 is in engagement with a driver 743 (here in the form of a plastics part) which is fastened to the shield 3. An activation of the motor 740 thus brings about an adjustment of the headrest 7 along the rails 32a, 32b. A height of the headrest pad 70 may thereby be set.

A spindle cage 742 surrounds the spindle 741 and the driver 743 on two opposite sides and rotatably supports a free end of the spindle 741. The spindle cage 742 protects the spindle 741 and provides end stops for the driver 743.

The headrest 7 furthermore may include a further drive mechanism 73 for actuating the scissors kinematics 71. The drive mechanism 73 may include a motor 730 which is fastened to the carrier 72. The activation of the motor 730 unfolds or folds up the scissors kinematics 71 depending on the direction of rotation. By this means, a depth position of the headrest pad 70 may be changed. This motor 730 is optionally likewise activated via the connection cable 744.

FIGS. 11A and 11B show two different height settings of the headrest 7 (and therefore height positions of the headrest pad 70). It may be seen how the carrier 72 is guided on the rails 32a, 32b in order to change the position of the headrest pad 70 relative to the shield 3. While the headrest pad 70 is shown in the lowest position in FIG. 11A, FIG. 11B shows the highest position thereof. In an upright position of the backrest 1, the direction of the adjustment runs parallel to the Z axis of the system of coordinates of the vehicle, i.e. the vertical axis of the vehicle.

FIGS. 11C and 11D show two different horizontal settings of the headrest 7 (and therefore horizontal positions of the headrest pad 70). The carrier 72 does not change its position here relative to the shield 3. However, in this case, the scissors kinematics 71 are extended such that the headrest pad 70 is shifted relative to the carrier 72 and to the shield 3. In an upright position of the backrest 1, the direction of this adjustment runs parallel to the X-axis of the system of coordinates of the vehicle, i.e. the longitudinal axis of the vehicle. FIG. 11C shows the same position as FIG. 11A and serves for better comparison.

Figure 12A:
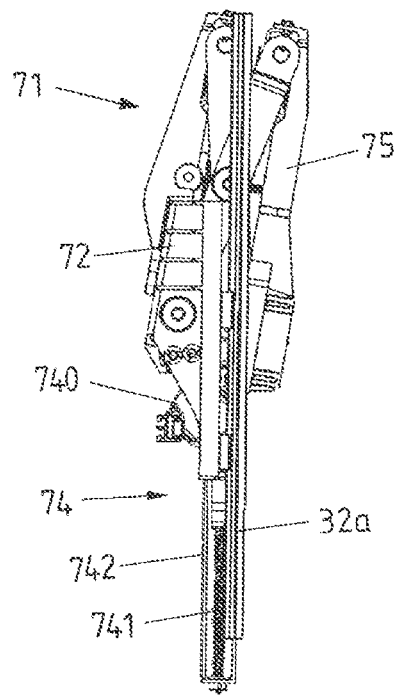
FIGS. 12A-12D show side views of drive and adjustment mechanisms and of a base of the headrest of the backrest according to FIGS. 10A-10C in various adjustment positions which may be adjusted by means of the drive and adjustment mechanisms.
Figure 12B:
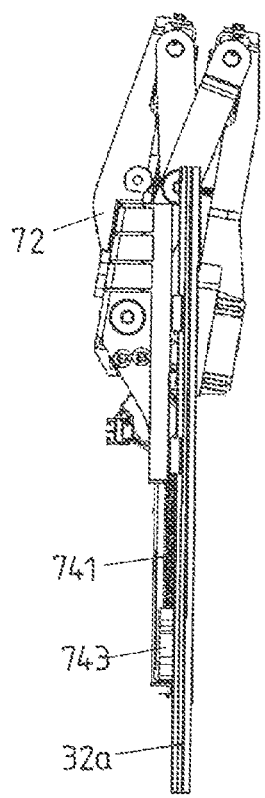

FIGS. 12A and 12B show the same positions of the carrier 72 relative to the rails 32a, 32b as FIGS. 11A and 11B, wherein the view of the two drive mechanisms 73, 74 is opened up. It may be seen that, in the event of an adjustment in this direction (Z direction), the scissors kinematics 71 are not adjusted.

Figure 12C:
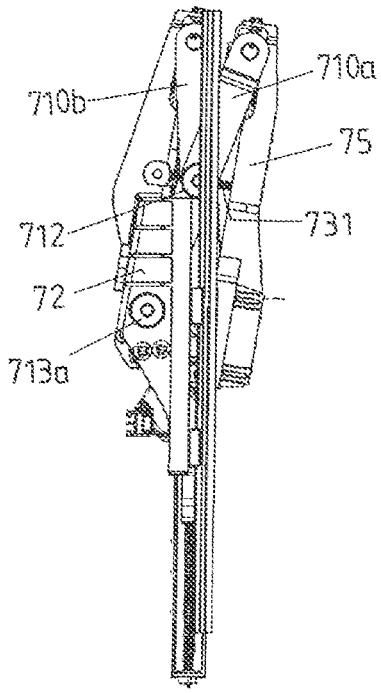
Figure 12D:
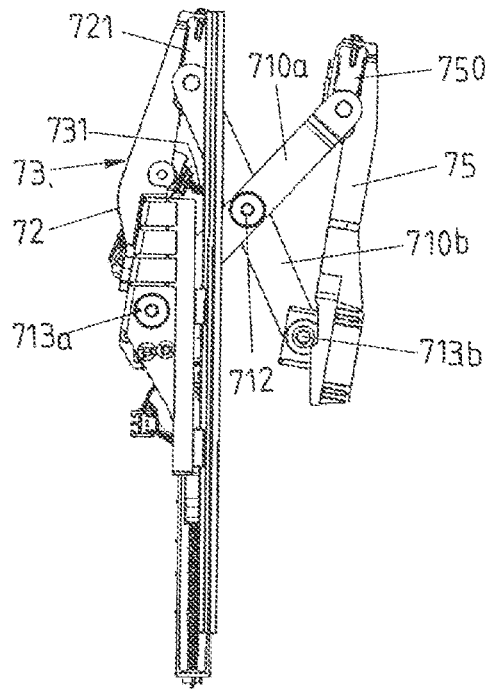

FIGS. 12C and 12D show the same setting positions of the scissors kinematics 71 as FIGS. 11C and 11D. FIG. 12C shows the same position as FIG. 12A. The scissors kinematics 71 comprise two pairs of levers in the form of scissors arms 710a, 710b (see in addition FIG. 10C).

Each of the scissors arms 710a, 710b may include two outer bearing points and a central bearing point arranged inbetween. The two scissors arms 710a, 710b of each pair are mounted pivotably on each other at the central bearing point. In the present case, a connecting axis 712 is provided at which each of the total of four scissors arms 710a, 710b is mounted at the respective central bearing point. One of the outer bearing points (here the lower one during use) of the one scissors arm 710a of each of the two pairs is mounted pivotably on the carrier 72 via a pivoting hinge 713a. The respective other outer bearing points of the scissors arms 710a are mounted pivotably and displaceably in a slotted guide 750 in a base 75. One of the outer bearing points (here the lower one during use) of the other scissors arm 710b of each of the two pairs is mounted pivotably on the base 75 via a pivoting hinge 713b. The respective other outer bearing point is mounted pivotably and displaceably in a slotted guide 721 of the carrier 72.

The connection to the slotted guides 721, 750 takes place via two connecting rods 711a, 711b which each connect (and extend inbetween) the bearing points, assigned to the slotted guides, of the scissors arms 710a, 710b.

By this means, it is possible to adjust the base 75 along a straight line, wherein the mechanism has a particularly flat construction depth in the folded up state (see FIGS. 12A and 12C).

The adjustment of the scissors kinematics 71 takes place by means of the motor 730 (see for example FIG. 10C). The latter drives a spindle 731 which may be seen for example in FIG. 12D and which acts on the connecting axis 712 in order to unfold or fold up the scissors kinematics 71.

The headrest pad 70 is fastened to the base 75.

The headrest 7 may thus be adjusted independently of one another in two different directions relative to the shield 3. An element of the headrest 7, here the headrest pad 70, is moved here in these two directions relative to the shield 3.

Figure 13:
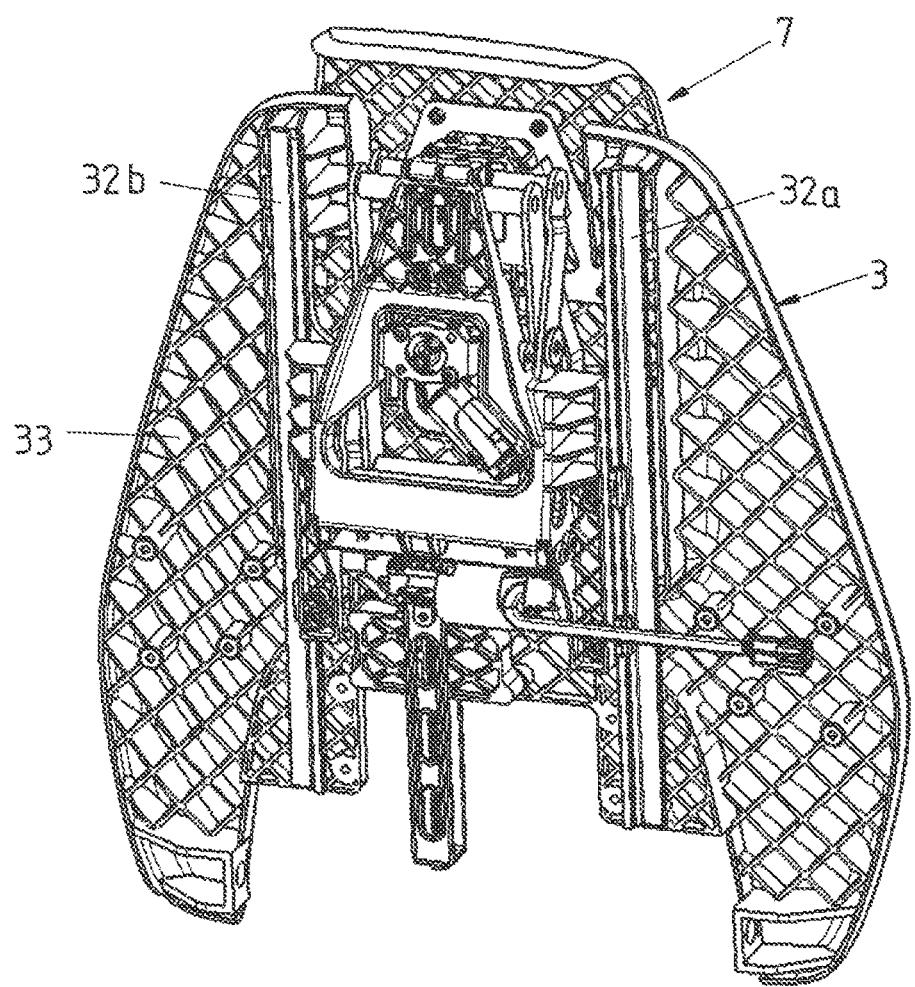
FIG. 13 shows a perspective view of a variant embodiment of the shield of the backrest according to FIGS. 10A-10C.

FIG. 13 shows an alternative embodiment of the rails 32a, 32b and furthermore corresponds to the variant embodiment according to FIGS. 10A to 12D. According to FIG. 13, the rails 32a, 32b are formed or molded on the shield 3, for example are sprayed thereon by means of injection molding. For example, the rails 32a, 32b of FIG. 13 are composed of the same material as the stiffening ribs 701.

Figure 14:
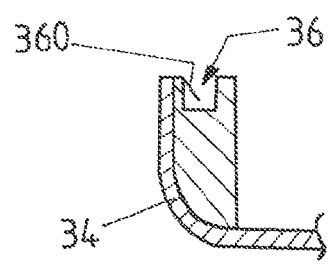
FIG. 14 shows an optional piping channel of the shield of the backrest according to FIGS. 10A-10C in a cross-sectional view.

FIG. 14 shows an optional piping channel 36 of the shield 3 for a lining or cover. The piping channel 36 extends, for example, along an outer edge of the shield 3 (optionally correspondingly on the headrest pad 70). Piping hooks 360 in or on the piping channel 36 hold the cover or the lining in the piping channel 36.

By means of formation of a plurality of parts of the backrest head LK, for example of the shield 3 of the headrest pad 70, the carrier 72, the driver 743 and/or the base 75, from plastic, a particularly low weight and a particularly flexible adaptability are possible.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Backrest
2 Backrest frame
20a, 20b Crossmember
21, 22 Backrest strut (backrest side part)
210, 220 Bearing tab
24 Retractor receptacle
3 Shield (support element)
30 Support surface
305a, 305b Connecting tab (connecting portion)
306 Fastening region
31, 32 Bearing arm (bearing portion)
310, 320 Film hinge
311, 321 Resting portion
32a, 32b Rail
33 Stiffening ribs
34 Organosheet 35a, 35b Connecting portion
36 Piping channel
360 Piping hook
37 Carrying plate
38a, 38b Headrest sleeve
4 Retractor
40 Seat belt
41 Retractor drive
5 Lever mechanism/coupling mechanism
50 Connecting rod/guide rod (connecting element)
500 Coupling rod (coupling element)
51, 52 Pivoting lever
51.1, 51.2, 52.1, 52.2 Limb
512, 522 Hinge point
516, 526 Buckling point
53a, 53b Connecting lever (connecting element)
540a, 540b Guide slot
54a, 54b Slotted guide part
55, 56 Pivoting lever
552, 562 Hinge point
6 Drive unit
60 Drive rod (drive element)
600 Rod head
7 Headrest
70 Headrest pad
700 Organosheet
701 Stiffening ribs
71 Scissors kinematics
710a, 710b Scissors arm
711a, 711b Connecting rod
712 Connecting axis
713a, 713b Pivoting joint
72 Carrier
720 Slider
721 Slotted guide
73 Drive mechanism
730 Motor
731 Spindle
74 Drive mechanism
740 Motor
741 Spindle
742 Spindle cage
743 Driver
744 Connection cable
75 Base
750 Slotted guide
A1 Drive
B1, B2 Fitting
E Injection
LK Backrest head
M Backrest head module
S1, S2 Pivot axis
SA1, SA2 Side part adapter/fitting part While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A backrest for a vehicle seat, the backrest comprising:
a backrest frame;
a backrest head including a support element configured to support a shoulder region of a user;
a drive unit disposed on the support element;
a lever mechanism operatively connected to the drive unit and configured to pivot the support element; and
a drive element configured to translate to actuate the lever mechanism and pivot the support element,
wherein the lever mechanism includes a first lever and a second lever each coupled to the backrest frame;
wherein the lever mechanism further includes an element coupling the first lever and the second lever to one another, wherein the drive element is configured to engage the element.

2. The backrest of claim 1, further comprising:
a drive element configured to translate to actuate the lever mechanism and pivot the support element.

3. The backrest of claim 2, wherein the lever mechanism is configured to convert a translating adjustment of the drive element to pivot the support element.

4. The backrest of claim 1, wherein the support element, the drive unit, and the lever mechanism form at least a portion of a backrest head module configured to be mounted to a premanufactured construction unit disposed on the backrest frame.

5. The backrest of claim 1, wherein the lever mechanism includes a connecting element adjustably mounted to the support element and the first lever is coupled to the connecting element.

6. The backrest of claim 1, further comprising:
a retractor configured to retract a seat belt and disposed on the backrest frame.

7. The backrest of claim 1, wherein the first lever is V-shaped.

8. The backrest of claim 7, wherein the first lever includes two limbs collectively defining a buckling point and the drive element is operatively connected to the first lever to apply a force to the buckling point to pivot the support element.

9. The backrest of claim 8, wherein the connecting element is mounted to the support element and configured to move along a first guide slot.

10. The backrest of claim 9, wherein the connecting element is mounted to the support element and configured to move along a second guide slot opposing the first guide slot, wherein the second guide slot is positioned parallel to the first guide slot.

11. The backrest of claim 1, wherein the first lever includes two limbs connected to one another at a buckling point, and the element is connected to the buckling point.

12. The backrest of claim 1, wherein the backrest includes a backrest cushion and the support element includes a rear side facing away from the backrest cushion, and wherein the drive unit is disposed on the rear side of the support element.

13. The backrest of claim 1, further comprising:
a backrest cushion and the support element includes a support surface configured to support at least portion of the backrest cushion.

14. A backrest for a vehicle seat, the backrest comprising:
a backrest frame;
a backrest head provided with a support element configured to support a shoulder region of a user and configured to pivot with respect to the backrest frame; and
a headrest disposed on the support element and configured to be adjusted relative to the support element;
a rail fixed to the support element, wherein the headrest is adjustably mounted to the rail, wherein the rail is injection molded to the support element or formed integrally to the support element by injection molding;

a scissor kinematics connecting an element of the headrest to the support element, wherein the headrest includes a carrier coupled to the scissor kinematics and mounted to and configured to move along the rail; and a drive mechanism mounted on the carrier and configured to adjust the carrier relative to the support element.

15. The backrest of claim 14, wherein the headrest is configured to adjust in a first direction and a second direction each relative to the support element.

16. The backrest of claim 14, wherein the rail is configured to reinforce the support element.

17. The backrest of claim 14, wherein the
drive mechanism is configured to adjust the scissor kinematics.

18. A backrest head module for use in a vehicle seat and configured to be mounted to a premanufactured backrest frame, the backrest head module comprising:

a support element configured to support a shoulder region of a user;

a drive unit disposed on the support element;

a lever mechanism operatively connected to the drive unit and configured to pivot the support element about the backrest frame; and a drive element configured to translate to actuate the lever mechanism and pivot the support element, wherein the lever mechanism includes a first lever and a second lever each configured to be coupled to the backrest frame;

wherein the lever mechanism further includes an element coupling the first lever and the second lever to one another, wherein the drive element is configured to engage the element.

\* \* \* \* \*